United States Patent [19]
Szirmay

[11] 3,727,376
[45] Apr. 17, 1973

[54] PROCESS FOR THE SEPARATION OF A GASEOUS MIXTURE

[75] Inventor: Leslie V. Szirmay, Youngstown, Ohio

[73] Assignees: Edwin W. Oldham; Vern L. Oldham, Akron, Ohio ; part interest to each

[22] Filed: Oct. 20, 1971

[21] Appl. No.: 190,730

[52] U.S. Cl. ...........................................55/60, 55/79
[51] Int. Cl. ...............................................B01d 53/04
[58] Field of Search ............................55/60, 79, 390

[56] References Cited
UNITED STATES PATENTS

| | | | |
|---|---|---|---|
| 2,598,785 | 6/1952 | Groebe et al. | 55/79 |
| 2,609,887 | 9/1952 | Berg | 55/79 |
| 2,719,206 | 9/1955 | Gilmore | 55/390 |

*Primary Examiner*—Charles N. Hart
*Attorney*—Vern L. Oldham et al.

[57] ABSTRACT

This process relates to the separation of a gaseous mixture on a continuously moving solid adsorbent bed and applies particularly to the separation of a gaseous mixture characterized by linear, or quasilinear, adsorption isotherms and applies most particularly to the separation of ethane from ethylene on activated carbon.

9 Claims, 1 Drawing Figure

PATENTED APR 17 1973 3,727,376
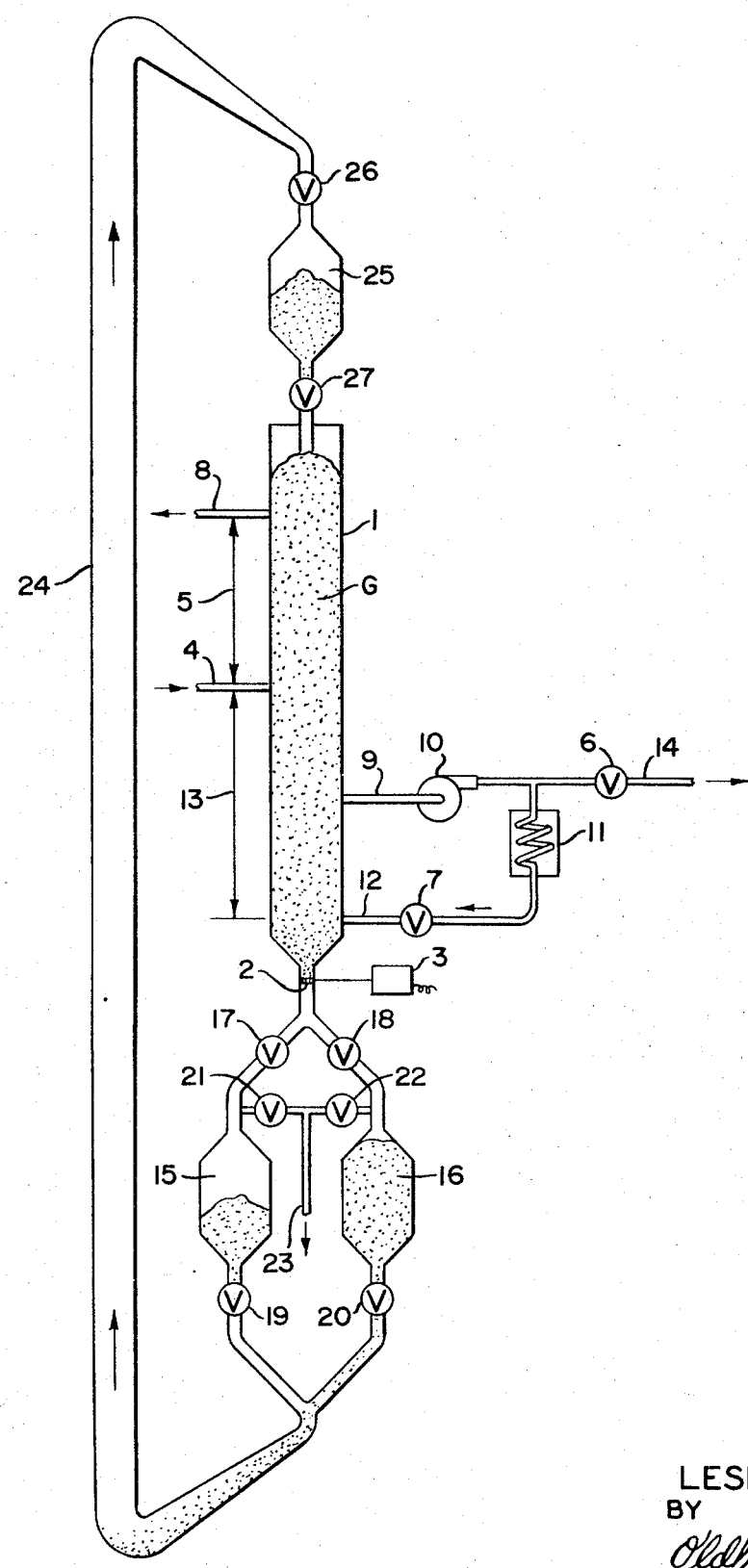
INVENTOR.
LESLIE V. SZIRMAY
BY
Oldham & Oldham
ATTORNEYS.

PROCESS FOR THE SEPARATION OF A GASEOUS MIXTURE

BACKGROUND OF THE INVENTION

Adsorption may be attributed to several factors acting separately or simultaneously. With respect to the adsorbent, one can distinguish between physical and chemical adsorption, and with respect to the adsorbate distinction can be made between polar and non-polar adsorption. The most important force resulting in physical adsorption is called the dispersion force, resulting in attraction between two atoms because of the distortion of the electron density in one atom, which induces a corresponding electrical moment in the atoms of the neighborhood. In chemisorption, a chemical compound is formed between adsorbent and adsorbate, and in contrast to physical adsorption, electron transfer always occurs.

It has been shown by Lewis et al. Ind. Eng. Chem. 42, 1,319 (1950) that in certain cases adsorption of a binary gas mixture can be expressed by linear adsorption isotherms. In general, this is true for non-polar physical adsorption, e.g., simultaneous adsorption of ethane and ethylene on activated carbon. In the case when a gaseous mixture can be characterized by linear adsorption isotherms, the rule that the degree of adsorbability is increasing with the increase of the molecular weight is strictly applicable.

Gas separation is a major problem in the chemical industry. Separation of gases may be accomplished by fractional distillation, solvent extraction, selective adsorption and similar processes. For example, ethylene purities up to 99.9 percent are being produced by low temperature distillation. Usually 50 – 90 plates and reflux ratios of 4 – 6 are required depending on the composition of the feed. With the present invention, similar separation could be achieved in one adsorption column of comparatively short length.

Prior U.S. Patents in this field include Nos. 2,519,873; 3,063,217 and 3,442,006.

The general object of the present invention is to provide a new method and apparatus for separating gaseous mixtures of materials characterized by linear or quasilinear adsorption isotherms.

Another object of the invention is to provide a relatively inexpensive method and apparatus for use in separating methane or ethane from gaseous mixtures of methane, ethane and ethylene.

Another object of the invention is to provide an external reflux section and an elevated temperature rectification section in a gas adsorbent system.

Further objects and advantages of the invention will become apparent as the specification proceeds.

PATENTABLE SUBJECT MATTER

The instant invention relates to a new process combining some of the features of fixed bed and moving bed adsorbers.

According to one aspect of the present invention, this process applies to the separation of gaseous mixtures characterized by linear or quasilinear means that the isotherm of any of the component of said gaseous mixture under no circumstances would cross the isotherm of any of the other component.

According to another aspect of the invention, it relates to a process for separating a gaseous mixture characterized by linear or quasilinear adsorption isotherms of the mixture components and it comprises separating said mixture in two groups of components of desired purity such that one group will consist of components having higher adsorbability than any of the remaining components in the other group. The group of components having the higher adsorbability of said gas mixture will be called henceforth as the bottom product and the other group will be called the top product. In one example, a gas mixture consisting of methane, ethylene, and ethane where methane is the least adsorbable and ethane is the most adsorbable component, one alternative is to yield a bottom product consisting of pure ethane and a top product consisting of a mixture of methane and ethylene, another alternative is to yield a bottom product consisting of a mixture of ethane and ethylene and a top product of pure methane.

According to another aspect of the invention, a process for separating the most adsorbable component or a group of the most adsorbable components of a gaseous mixture is provided and it comprises introducing said gas mixture, henceforth called feed, into a column counter-current to a gravity flow of granular adsorbent bed at a temperature above the condensation temperature of the feed, passing said feed through an adsorption zone and withdrawing the least adsorbing components as top product, subjecting the adsorbent bed below the feed point, henceforth called rectification section, to a temperature increase not less than about 20° C., withdrawing the desorbed gases resulting from said temperature increase at an appropriate point, forming an external reflux from said desorbed gases by recirculating to the rectification section at an appropriate rate and at appropriately elevated temperature so as to provide said temperature increase of said rectification section, withdrawing a fraction of said external reflux as a primary fraction of the bottom product, collecting the adsorbent at the lower end of the column in desorption bins, performing a batchwise desorption from the bin, and collecting the desorbed gases as a secondary fraction of the bottom product.

According to another aspect of the invention, apparatus for carrying out the process for separating the most adsorbable or a group of the most adsorbable components from a gaseous mixture is provided and it comprises a column having an upper adsorption zone, a lower rectification zone, means of maintaining constant mass flow rates of the downwardly moving granular adsorbent material, means for introducing feed gas, means for withdrawing the top product, means of heating the adsorbent bed in the rectification section by recirculating heated external reflux, means of withdrawing a fraction of the external reflux as a primary fraction of the bottom product, means of adjusting the temperature and the rate of recirculation of said external reflux in order to attain and maintain desired purity of the bottom product, means of collecting the granular adsorbent in desorption bins, which adsorbent is saturated with the bottom product according to conditions prevailing in the rectification section, means of stagewise desorbing and collecting gases from the desorption bin as a secondary fraction of the bottom product, performing the desorption by using vacuum and/or external heat and/or direct steam whichever combination is required in order to prevent degradation of the adsorbent and/or of the bottom product, means of cooling and/or drying the adsorbent in the desorption bin in order to recondition it to its original state, and means of returning the granular adsorbent to the top of the column and into an adsorbent storage bin.

EXAMPLE OF A PARTICULAR STRUCTURE AND ITS OPERATION

One form of the apparatus for carrying out the process according to the invention is shown diagrammatically in vertical section in the accompanying drawing.

Granulated adsorbent G is moving down by gravity in column 1. The rate of the adsorbent is controlled and adjusted at 2, which is a screen. Through this screen, no flow of adsorbent will occur unless the screen is vibrated by vibrator 3. Selecting the proper screen opening, the frequency, and the period of the vibration, a desired flow rate of the adsorbent through the column can be maintained, or the flow could be controlled in other known manners.

Feed as described hereinbefore is introduced at 4, at the bottom of the adsorption section, indicated by the numeral 5. By properly adjusting the valve 6 and valve 7, as described hereinafter, the column can be operated in such a way that at an upper portion of the column indicated at an outlet tube 8, only the least adsorbable component, or a group of the least adsorbable components of the feed will leave the column as top product. Below the feed inlet 4, at line or tube 9, desorbed gas is withdrawn corresponding in composition to the desired bottom product. One fraction of the gas withdrawn at 9 is recirculated by means of a pump 10, passed through a heater 11, and returned at an appropriate point or by a tube 12 as internal reflux, while another fraction is removed at or by a tube 14 as the primary fraction of the bottom product. The tube 14 naturally will connect to a suitable storage chamber or equivalent. The heat input at 11, and the rate of recirculation of the external reflux is so adjusted as to result in not less than about a 20° C. increase of the temperature of the adsorbent bed in the rectification zone in the lower portion of the column 1 and indicated at 13, relative to the adsorption zone 5.

The granulated adsorbent leaving the column at the screen 2 is saturated with the most adsorbable component (or components) according to the temperature prevailing in the rectification zone. The adsorbent in such condition could be collected in either of two desorption bins provided; namely, in 15 or in 16. Say it is collected in 15. In that case, valves 18, 19, 20, 21 and 22 are closed, while valve 17 is open until desorption bin 15 is completely filled. Thereafter valve 17 is closed and valve 18 is opened, thereby altering the adsorbent flow to the desorption bin 16. Desorption from bin 15 can be performed by vacuum and/or external heat and/or direct steam introduced into the bin. The desorbed gases are removed as a secondary fraction of the bottom product through line 23 by opening valve 21 and suitably collected from line 23. After desorption, the adsorbent in the bin is cooled and/or dried, and the reconditioned adsorbent is transferred through line or means 24, which can be a gas lift or a conveyor, to an upper storage bin 25 by opening valve 19 and valve 26 while valve 27 is closed. After transportation of the adsorbent material, valve 26 is closed and valve 27 is opened in order to permit flow of the adsorbent into column 1. Similar procedure is followed when adsorbent is collected in the desorption bin 16. In the case desorption and reconditioning of the adsorbent is comparatively a slow process, more than two desorption bins can be employed.

EXAMPLE

In one typical experimental run, Pittsburgh BPL type activated carbon was used as adsorbent at an adsorbent bed spaced or flow rate of 2 cm/min. at any horizontal section of the column 1. Feed at 4 entered the column at a temperature of 25° C. and at a pressure of 760 mm Hg. The composition of the feed was 80 percent methane, 10 percent ethylene and 10 percent ethane. The feed rate was kept at 1,000 ccm/min. per sq. cm of the adsorbent bed. Top product was withdrawn at the tube 8, at a rate of 900 ccm/min. per sq. cm of the adsorbent bed, and it had a composition of 11.1 percent ethylene and the remainder methane (no ethane was found in the top product). Primary bottom product was withdrawn at the tube 14, at a rate of 26 ccm/min. per sq. cm of adsorbent bed. The rate of recirculation of the remainder of the withdrawn product on through the heater 11 and tube 12, and the temperature of the heat exchanger 11 was adjusted so that the temperature of the adsorbent bed at 12 reached 50° C. Sufficient care was taken to maintain the temperature of the adsorbent at 50° C. in the desorption bin as by heating such bin and the material therein if it doesn't maintain such temperature by, for example, insulation means around the bin. After one of the desorption bins, say 16, has been filed with adsorbent saturated with ethane, valve 18 and 20 of the bin are closed and the adsorbate is removed through line 23 by applying vacuum to the interior of the bin and/or by raising the temperature of the adsorbent in the bin. The amount of adsorbate removed at line 23 as secondary bottom product was 37 ccm per ccm of adsorbent measured at a temperature of 25° C. and at a pressure of 760 mm Hg. Both the primary and the secondary bottom product was found to be of high purity of ethane, 99.9 percent or higher. The withdrawal at line or tube 23 would be 37 ccm per ccm of adsorbent on a time average equivalent to 74 ccm per minute. Or the total withdrawal would equal 100 ccm per minute for an input of 100 ccm by tube or line 4. It will be noted that the withdrawal hence is semi-continuous.

The rate of percentage of withdrawal at 14, relative to the total withdrawal at 14 and 23 depends on the temperature increase in section 13.

Hence, with greater increases in temperature in the section 13, then greater amounts of the ethane can be withdrawn at 14. Likewise, it is difficult to define exactly the percentage of the internal reflux or amount of the gas returned by the line 12 to the processing column 1 because it is the function of more than one parameter such as the adsorbent bed velocity, the properties of the feed gas, the temperature increase in section 13, etc. It should be noted that the rate of internal reflux is strictly independent of the rate of withdrawal by the tube 14.

The feed material has been absorbed by the activated carbon particles in the section 13 and the increased temperature of such section of the processing column 1, by the increased heat, drives off part of the gas absorbed, the rate of which is exactly equal to the rate of withdrawal at the tube 14 under most processing conditions.

The desorption of the gas in the bins 15 and 16 can be obtained under any suitable conditions of heat, vacuum and steam temperature or volume of steam supplied so that any suitable combination of these various heating means or pressure means obtains satisfactory results.

The activated carbon particles used in the process of the invention is of a conventional nature such as Pittsburgh BPL activated carbon. This carbon is made from selected grades of bituminous coal combined with suitable binders. The majority of the pores are micropores and the internal part of the particles are completely permeable to gases through macropores.

The adsorbent material in the bins 15 and 16 can readily be processed in the bins and be dried in the bins, as by a suitable source of external heat, if desired, and/or internal heat such as by the use of steam or a preheated inert purge gas, such as air, nitrogen, etc.

From the foregoing, it will be seen that a relatively easily practiced process has been provided for separation of the components of the gaseous mixture, and particularly to the separation of ethane from ethylene by the use of an adsorbent material, i.e. activated carbon. The process can be readily controlled and a full recovery of high purity ethylene and/or ethane can be obtained. The ethylene, of course, is obtained from the withdrawal tube 8 in the apparatus. Thus, the objects of the invention have been achieved.

While one complete embodiment of the invention has been disclosed herein, it will be appreciated that modification of this particular embodiment of the invention may be resorted to without departing from the scope of the invention as defined in the appended claims.

What is claimed is:

1. A process for separating a feed gas consisting of various components to a top product, consisting of the least adsorbable or a group of the least adsorbable components, and to a bottom product consisting of the most adsorbable or a group of the most adsorbable components, comprises introducing the feed gas into a vertical column counter-current to a gravity flow of granular adsorbent bed at a temperature above the condensation temperature of the feed gas, passing said feed gas through an adsorption zone and withdrawing the least adsorbing components as top product, subjecting the adsorbent bed below the point of introduction of the feed gas to a temperature increase not less than about 20° C. in a rectification section below the adsorption zone, withdrawing the desorbed gases resulting from said temperature increase at an appropriate point, forming an external reflux from said desorbed gases by recirculating to the rectification section at an appropriate rate and at an appropriately elevated temperature as to provide said temperature increase of said rectification section, withdrawing a fraction of said external reflux as a first fraction of the bottom product, collecting the adsorbent at the lower end of the column in desorption bins, performing a batchwise desorption from the bin and collecting the desorbed gases as a secondary fraction of the bottom product.

2. A process according to claim 1 including the step of selecting a feed gas which is characterized by linear or quasilinear adsorption isotherms.

3. A process according to claim 1 including the step of using a feed gas which is a mixture of ethane and ethylene and said granulated adsorbent is activated carbon.

4. A process according to claim 1 including controlling the rate of the downwardly moving granulated adsorbent bed.

5. A process according to claim 1 wherein the rectification effect is performed in said rectification section by recirculating said external reflux at an appropriate rate and by elevating to an appropriate temperature.

6. A process according to claim 2 wherein the first fraction of the bottom product is withdrawn continuously from said external reflux and a secondary fraction of the bottom product is collected by performing stagewise desorption of the adsorbent collected in said adsorbtion bins whereby high purity of bottom and top products can be attained.

7. A process for separating a feed gas consisting of various components to a top product, consisting of the least adsorbable or a group of the least adsorbable components, and to a bottom product consisting of the most adsorbable or a group of the most adsorbable components and which consists of the steps of introducing the feed gas into a vertical column at a feed point for flow counter-current to a gravity flow of a granular adsorbent bed downwardly of the column at a temperature above the condensation temperature of the feed gas, passing said feed gas through an adsorption zone in the column and withdrawing the least adsorbable components as a top product, subjecting the adsorbent bed below the feed point to a temperature increase of not less than about 20° C. and forming a rectification section in a lower portion of the column, withdrawing the desorbed gases resulting from said temperature increase at a point in the rectification section, forming an external reflux from said desorbed gases by recirculation to a lower portion of the rectification section at a rate and heating a fraction of the desorbed gases to such an elevated temperature as to provide said temperature increase of said rectification section, withdrawing the remainder of said desorbed gases as a first fraction of the bottom product, collecting the adsorbent at the lower end of the column, performing a desorption action on the absorbent, and collecting the desorbed gases as a secondary fraction of the bottom product.

8. A process according to claim 7 wherein said feed is characterized by linear or quasilinear adsorption isotherms.

9. A process according to claim 8 including continuously withdrawing said first fraction of the bottom product from said external reflux and a secondary fraction of the bottom product is collected by performing intermittent desorption of the adsorbent collected.

* * * * *